United States Patent
D'Souza et al.

(10) Patent No.: US 11,042,429 B2
(45) Date of Patent: Jun. 22, 2021

(54) SELECTIVE STACK TRACE GENERATION DURING JAVA EXCEPTION HANDLING

(71) Applicant: INTERNATIONAL BUSINESS MACHINES CORPORATION, Armonk, NY (US)

(72) Inventors: Irwin D'Souza, Toronto (CA); Kevin J. Langman, Maple (CA); Daniel Heidinga, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

(21) Appl. No.: 16/241,180

(22) Filed: Jan. 7, 2019

(65) Prior Publication Data

US 2020/0218553 A1     Jul. 9, 2020

(51) Int. Cl.
*G06F 11/07* (2006.01)
*G06F 9/455* (2018.01)
(Continued)

(52) U.S. Cl.
CPC ........ *G06F 11/0751* (2013.01); *G06F 9/4552* (2013.01); *G06F 11/0772* (2013.01); *G06F 11/0778* (2013.01); *G06F 11/3636* (2013.01); *G06F 9/4812* (2013.01); *G06F 2209/481* (2013.01)

(58) Field of Classification Search
CPC ......... G06F 11/36–3644; G06F 11/366; G06F 11/302; G06F 11/324; G06F 11/3466; G06F 11/3476; G06F 11/3495; G06F 9/455–45529; G06F 2209/481;
(Continued)

(56) References Cited

U.S. PATENT DOCUMENTS

| 5,740,441 A * | 4/1998 | Yellin | G06F 9/44589 |
| | | | 714/E11.211 |
| 6,487,716 B1 | 11/2002 | Choi et al. | |

(Continued)

OTHER PUBLICATIONS

Anonymous, "How uncaught exceptions are handled", http://www.javamex.com/tutorials/exceptions/exceptions_uncaught_handler.shtml, accessed Oct. 18, 2018, 3 pages.
(Continued)

*Primary Examiner* — Todd Aguilera
(74) *Attorney, Agent, or Firm* — Michael O'Keefe; Andrew D. Wright; Roberts Calderon Safran & Cole, P.C.

(57) ABSTRACT

Systems and methods for selective stack trace generation during Java exception handling are disclosed. In embodiments, a method includes determining, by a Java virtual machine (JVM) of a computing device, that an exception object escapes a catch block of Java bytecodes; setting, by the JVM of the computing device, an escaped flag based on the determining that the exception object escapes the catch block; walking, by the JVM of the computing device, a call stack to locate an applicable catch block for the exception object, wherein the applicable catch block is the catch block; determining, by the JVM of the computing device, that the escaped flag is set in response to locating the applicable catch block; and creating, by the JVM of the computing device, a stack trace based on the determining that the escaped flag is set.

17 Claims, 3 Drawing Sheets

(51) Int. Cl.
*G06F 11/36* (2006.01)
*G06F 9/48* (2006.01)

(58) Field of Classification Search
CPC .............. G06F 9/4812; G06F 11/0751; G06F 11/0772; G06F 11/0778; G06G 9/4812
See application file for complete search history.

(56) References Cited

U.S. PATENT DOCUMENTS

| | | | |
|---|---|---|---|
| 6,886,094 B1* | 4/2005 | Blandy | G06F 9/30072 |
| | | | 712/233 |
| 7,003,778 B2 | 2/2006 | Sokolov | |
| 7,461,386 B2 | 12/2008 | Schwabe et al. | |
| 7,877,740 B2 | 1/2011 | Mehta | |
| 8,359,604 B2* | 1/2013 | Duffy | G06F 9/3865 |
| | | | 719/318 |
| 9,052,980 B2 | 6/2015 | Hulick, Jr. | |
| 9,304,778 B2 | 4/2016 | Duffy | |
| 2004/0128658 A1 | 7/2004 | Lueh et al. | |
| 2010/0185840 A1* | 7/2010 | Duffy | G06F 9/4812 |
| | | | 712/244 |

OTHER PUBLICATIONS

Jiang et al., "A debugging approach for java runtime exceptions based on program slicing and stack traces", http://ieeexplore.ieee.org/document/5562992/, 2010 10th International Conference on Quality Software (QSIC), Jul. 14-15, 2010, 3 pages.

Janssen, "How to Specify and Handle Exceptions in Java", https://stackify.com/specify-handle-exceptions-java/, Jul. 17, 2017, 9 pages.

\* cited by examiner

SELECTIVE STACK TRACE GENERATION DURING JAVA EXCEPTION HANDLING

BACKGROUND

The present invention relates generally to JAVA exception handling and, more particularly, to selectively generating a stack trace during JAVA exception handling.

JAVA is a registered trademark of Oracle America, Inc. used in conjunction with a general-purpose computer-program language. JAVA applications are typically compiled to bytecode that can be run on any JAVA virtual machine (JVM). Errors in JAVA execution are handled by an exception handler of the JVM. When an exception event occurs during the execution of JAVA code (either while interpreting JAVA bytecodes or while executing native compiled code), an exception object is created. An exception event in JAVA is characterized by the creating and throwing of an exception object. When a method throws an exception object, the JVM searches the call stack (the ordered list of methods that has been called to get the method) for a piece of code that handles it. The handling for one or more exception types by the JVM is implemented with catch blocks. Exception handling is coded in the catch blocks, which can try to fix the problem or log an error and exit. A stack unwinding mechanism unwinds or walks up the stack frames from a bottom frame of a runtime call stack, one frame at a time, and uses the records deposited by a JAVA compiler to discover a topmost handler that handles the exception. In implementations of JAVA, when an exception is thrown, the exception handler creates a snapshot of the call stack (i.e., stack trace) so that the JAVA stack can potentially be printed out if either the exception thrown is not caught by a catch block, or if a user decides to print out the call stack.

SUMMARY

In an aspect of the invention, a computer-implemented method includes: determining, by a JAVA virtual machine (JVM) of a computing device, that an exception object escapes a catch block of JAVA bytecodes; setting, by the JVM of the computing device, an escaped flag based on the determining that the exception object escapes the catch block; walking, by the JVM of the computing device, a call stack to locate an applicable catch block for the exception object, wherein the applicable catch block is the catch block; determining, by the JVM of the computing device, that the escaped flag is set in response to locating the applicable catch block; and creating, by the JVM of the computing device, a stack trace based on the determining that the escaped flag is set.

In another aspect of the invention, there is a computer program product including a computer readable storage medium having program instructions embodied therewith. The program instructions are executable by a computing device to cause the computing device to: create, by a JAVA virtual machine (JVM), an exception object in response to an exception event; determine, by the JVM, whether an escaped flag has been set for a catch block associated with the exception object; and determine, by the JVM, whether to create a stack trace based on the determining whether the escaped flag is set, wherein the JVM creates the stack trace when the escaped flag is set and does not create the stack trace when the escaped flag is not set.

In another aspect of the invention, there is a system including: a processor, a computer readable memory and a computer readable storage medium associated with a computing device; a JAVA virtual machine (JVM); program instructions to walk a stack by an exception hander of the JVM to locate an applicable catch block from a plurality of catch blocks, if present, in response to a JAVA thread throwing an exception at runtime; program instructions to determine whether an escaped flag is set for the applicable catch block based on the JVM locating the applicable catch block; program instructions to create a snapshot of the stack by the exception handler of the JVM upon determining that the escaped flag is set; program instructions to unwind the stack and transfer control of exception handling to the applicable catch block, a user defined catch block, or a default catch block; upon determining that the escaped flag is not set; program instructions to identify the exception as an uncaught exception based on the JVM failing to locate the applicable catch block; and program instructions to create the stack snapshot by the exception handler based on identifying the exception as the uncaught exception, wherein the program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
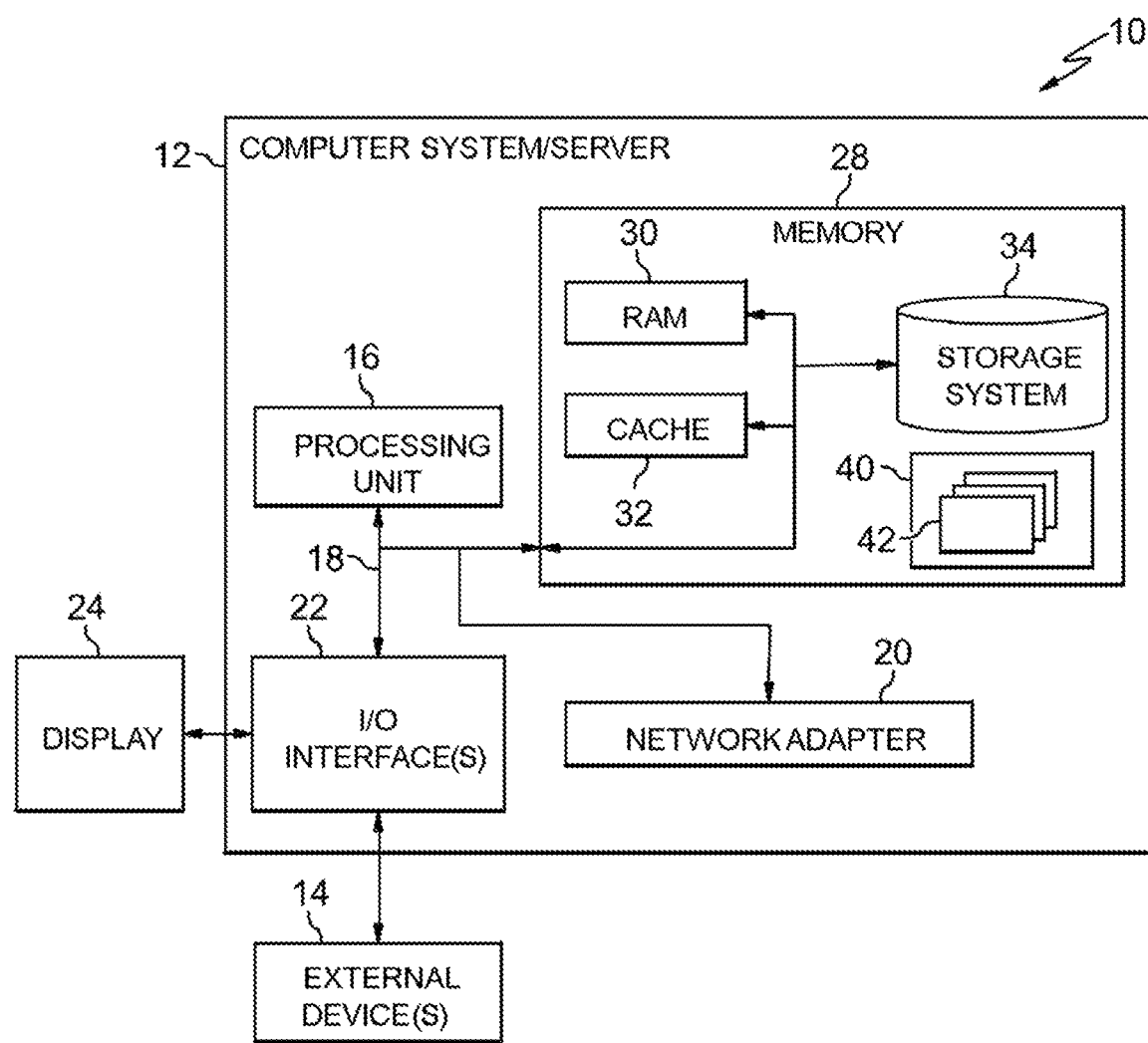
FIG. 1 depicts a computing infrastructure according to an embodiment of the present invention.

The present invention relates generally to JAVA exception handling and, more particularly, to selectively generating a stack trace during JAVA exception handling. In embodiments, a system and method is provided for selective JAVA exception stack trace creation to optimize and improve exception handling. In embodiments, when an exception is thrown during JAVA runtime, an exception handler of the present invention obtains all of the call stack information and writes it to a string (which can be printed when needed) only when the JAVA virtual machine (JVM) determines that there is a consumer of the string.

Errors occur routinely during the execution of software. When an exception event occurs in JAVA, it is referred to as throwing an exception. In some implementations of JAVA, when an exception is thrown in JAVA, the JVM exception handler creates a snapshot of the call stack (i.e., a stack trace) so that the JAVA stack can potentially be printed out if either the exception thrown is not caught or the user decides to print out the stack. However, generating this snapshot adds a significant amount of overhead to the exception handling process. One way of reducing overhead is to have the stack snapshot contain a list of program counters (PCs) which point to either section of Just-in-Time (JIT) generated code or bytecodes. When the need arises, the full JAVA stack can be built up using just this information. However, when an exception is caught, because the catch block is JAVA code, there can be changes in the runtime environment like Garbage Collection which can trigger Code Cache Reclamation or Class Unloading. As a result, the PCs may not be valid anymore. This in turn means that the stack trace (representation of the call stack at a certain point in time) that was described by the exception object could be incorrect.

Advantageously, with methods of the present invention: (1) allow for skipping one of the required stack walks; and (2) the string is only created when it is needed. That is, if the string is not needed, the exception handler only unwinds the stack and transfers control to the appropriate catch block. This results in the exception handler overhead being much lower on average than with other exception handling methods. Accordingly, embodiments of the present invention constitute improvements in the field of JAVA exception handling, and utilize unconventional steps to selectively create stack snapshots by an exception handler of a JVM. Moreover, embodiments of the invention constitute an improvement to the functioning of a JVM, and provide a technical solution to the technical problem of balancing exception handling overhead with an accurate stack trace.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
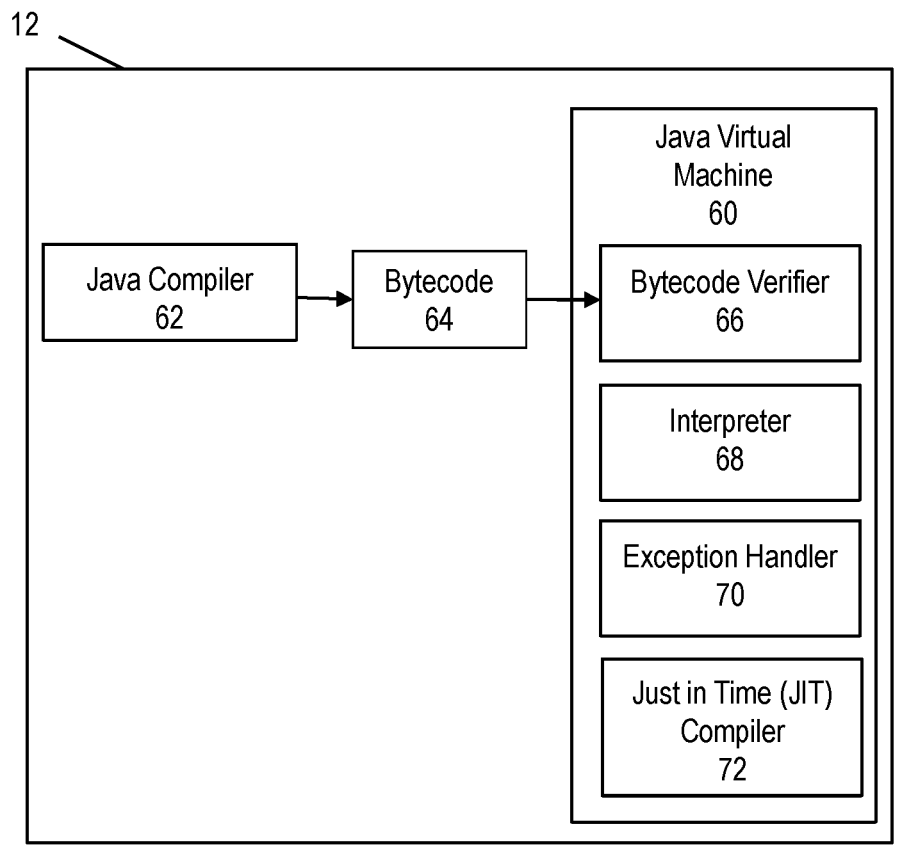
FIG. 2 shows an exemplary environment in accordance with aspects of the invention.

FIG. 2 shows an exemplary JVM 60 in accordance with aspects of the invention, which is utilized in the computer system 12. The computer system 12 is shown for exemplary purposes, but it should be understood that the JVM 60 of the present invention can be utilized in a variety of computing environments, and is not limited to use on the computer system 12. In general, the JVM 60 is a runtime engine of a JAVA Platform, which allows programs written in JAVA or other language compiled into JAVA bytecode to run on a computer system (e.g., the computer system 12). In aspects, the JVM 60 is implemented in the computer system 12 as one or more program modules 42. The JVM 60 may utilize existing JAVA tools and methods, with modifications made as necessary to enable unconventional exception handling steps of the present invention described below.

In aspects, the present invention comprises a JAVA compiler 62 outputting JAVA bytecode 64 (hereafter bytecode 64), a bytecode verifier 66, an interpreter 68, an exception handler 70, and a Just in Time (JIT) compiler 72. The term JAVA compiler 62 as used herein refers to one or more program modules configured to output the bytecode 64. The term bytecode verifier 66 as used herein refers to one or more program modules of the JVM 60 configured to verify the bytecode before it is executed. The term interpreter as used herein refers to one or more modules of the JVM 60 configured to interpret JAVA class files for a particular hardware platform. The interpreter 68 decodes each bytecode and runs a series of machine instructions for that bytecode.

The term exception handler as used herein refers to one or more modules of the JVM 60 configured to handle an exception thrown during JAVA runtime. In embodiments of the invention, the exception handler 70 is configured to walk a stack to locate an appropriate catch block for an exception object in response to a JAVA thread throwing an exception at runtime, and create a stack trace when an escape flag is set by the JVM 60 (indicating that an exception object escapes an associated catch block).

JIT compiler as used herein refers to one or more modules of the JVM 60 configured to execute computer code including compilation during execution of the program at run time rather than prior to execution. In accordance with embodiments of the present invention, the JIT compiler 72 is configured to perform an escape analysis pass on the intermediate language (IL) to determine, for each identified catch block, whether an exception object escapes the respective catch block.

It should be understood that the JVM 60 may contain addition or fewer components than those depicted in FIG. 2. In embodiments, separate components may be integrated into a single computing component or module. Additionally, or alternatively, a single component may be implemented as multiple computing components or modules.

Figure 3:
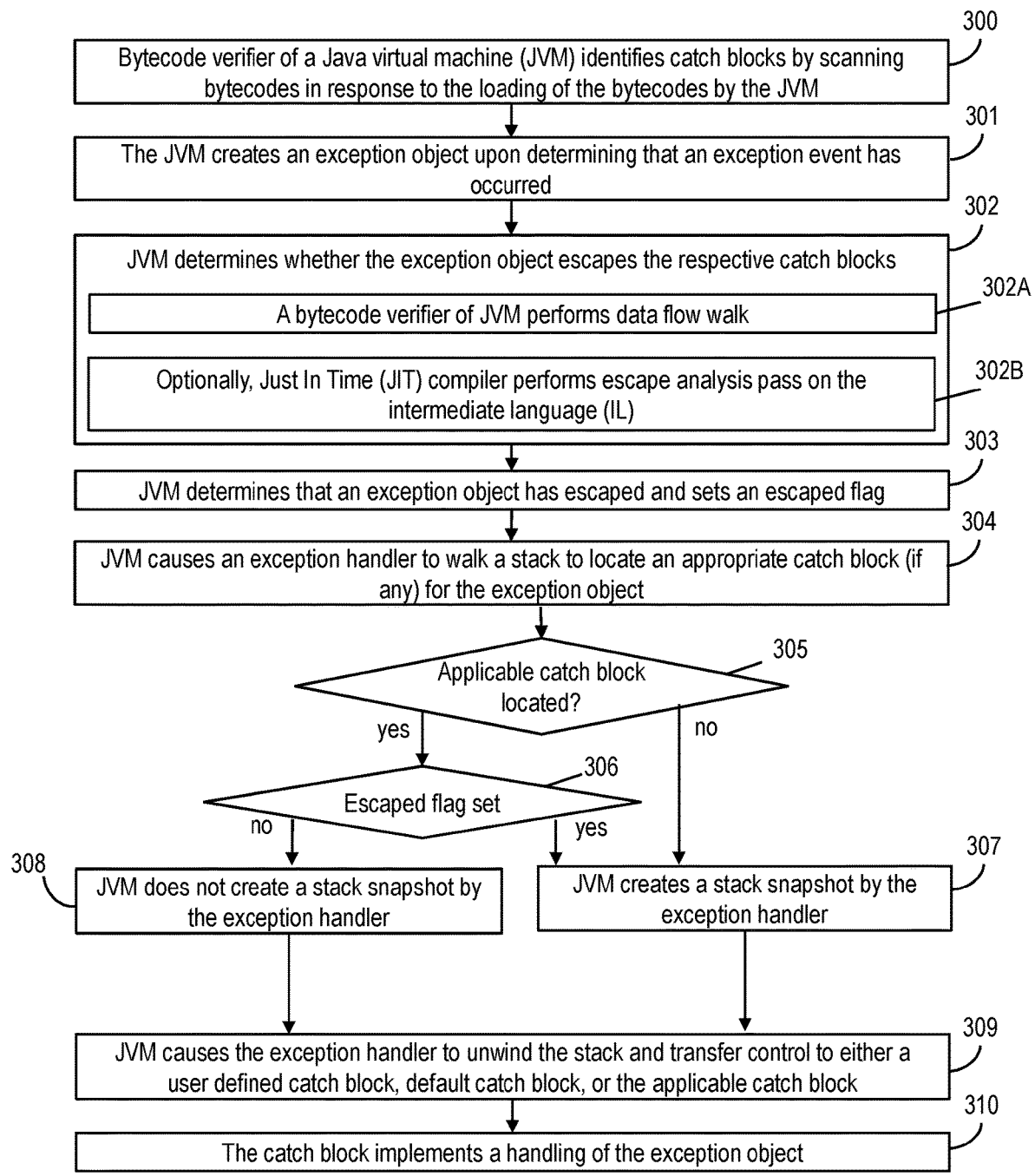
FIG. 3 shows a flowchart of steps of a method in accordance with aspects of the invention.

FIG. 3 shows a flowchart of a method in accordance with aspects of the invention. Steps of the method of FIG. 3 may be performed in the environment illustrated in FIG. 2, and are described with reference to elements shown in FIG. 2.

At step 300, the JAVA virtual machine (JVM) 60 identifies catch blocks by scanning bytecodes, in response to the loading of the bytecodes 64 by the JVM 60. In aspects, when the JVM 60 loads the bytecodes 64, the bytecode verifier 66 scans through them and finds one or more catch blocks. Exception handling is coded in the catch blocks, which can try to fix a problem or log an error and exit.

At step 301, the JVM 60 creates an exception object upon determining that an exception event has occur. As noted above, when an exception event occurs during the execution of JAVA code (either while interpreting JAVA bytecodes or while executing native compiled code), an exception object is created. An exception event in JAVA is characterized by the creating and throwing of an exception object. In embodiments, the exception handler 70 of the JVM 60 implements step 301. As used herein, the term exception object refers to an instance of an exception class identifying the kind of error (exception event) that has occurred. The JVM 60 may create the exception object utilizing existing exception object creation tools and methods. In aspects, the exception object contains information about the exception event (e.g. error), including its type and the state of the program being run when the error occurred.

At step 302, the JVM 60 determines, for each catch block identified at step 300, whether the exception object of step 301 escapes the respective catch blocks. In implementations, the JVM 60 performs a very lightweight escape analysis to determine whether or not an exception object escapes a catch block. This could be as simple as the JVM asking the question "Does any call or throw use this object?" If the answer is no, then the exception object escapes the catch block. Step 302 may be implemented at different times in a JAVA process. In embodiments, the JVM 60 may determine whether an exception escapes a catch block using a two stage approach. A first stage represented at step 302A below comprises a lightweight data flow done in the JVM 60 as an additional data flow walk by the bytecode verifier 66. The second stage represented at step 302B comprises a more formal Escape Analysis done by the JIT 60 compiler later in the JAVA execution process.

At step 302A, the JVM 60 performs a data flow analysis to determine whether the exception object of step 301 escapes the respective catch blocks. In implementations, the bytecode verifier 66 of the JVM 60 implements step 302A. An algorithm for implementing step 302A (e.g., stage 1 of a 2 stage process) comprises: (A) the JVM 60 marks an exception object as escaping if the first bytecode in a catch block is any bytecode except "pop" and "astore"; (B) the JVM 60 marks the exception as non-escaping if the first bytecode is "pop"; and (C) if the first bytecode is an "astore" then: at step 1, the JVM 60 allocates a bit array with one bit for each local, using 1 to indicate a local holds the exception; at step 2, the JVM 60 walks the bytecodes; at step 3, if an aload from the local is hit, the JVM 60 marks the exception as escaped; at step 4, if any backward branch is hit, the JVM 60 marks the exception as escaped; at step 5, if any forward branch is hit, the JVM 60 records the locals array and uses the current value to walk both branches, wherein on any branch that stores something else to the tracked local, nothing escaped; and at step 6, for each nested catch block, the JVM 60 recursively repeats steps 1-6. In embodiments, the above-identified algorithm works well for exceptions that are thrown, caught, and ignored with very little work done; or for catch blocks that have straight line code. However, for more general catch blocks, the algorithm may be more conservative than is desirable, and may result in catch blocks being marked as "exception escaped" even if it is not the case. To get around this potential problem, a second stage outlined in step 302B below may be utilized by the JVM 60.

At step 302B, the JIT 72 performs an escape analysis pass on intermediate language (IL). In implementations, when a method is queued for compilation, the JIT 72 performs a formal Escape Analysis pass on the IL it generates and updates the catch block metadata. The benefit of this second stage is that the overhead of generating IL and performing the formal data flow analysis can be deferred to the JIT 72, which performs it in the background, while a conservative but cheap analysis (in terms of resources consumed) can be done up front by the JVM 90 at start up (step 302A), resulting in the best of both worlds.

At step 303, the JVM 60 determines that an exception object has escaped a catch block at 301, and sets an escaped flag in response. In aspects, the JVM 60 sets an escaped flag (e.g., &Escaped8) in metadata of the program in response to determining that the exception object escaped the catch block at step 301. In aspects, the exception handler 70 of the JVM 60 implements step 303. In implementations, data structure in the program that maintains a list of catch blocks may be modified to include the flag. It should be noted that the present invention does not address situations where the JVM 60 determines that an exception object has not escaped a catch block. In such situations, conventional JAVA exception implementations may be utilized.

At step 304, the JVM 60 walks a call stack and locates an appropriate catch block (if any) for the exception object. The term catch block as used herein refers to a block of code for handling an exception in JAVA. An appropriate catch block in the context of step 304 is a block of code that is configured to implement the handling of the particular error event associated with the exception object. In implementations, the exception handler 70 of the JVM 60 performs a lightweight stack walk to locate the appropriate catch block (hereafter applicable catch block) for the exception object. JAVA tools and methods for locating an applicable catch block, if any, may be utilizing in the implementation of step 304.

At step 305, the JVM 60 determines whether a catch block was located at step 304 for the exception object. In aspects, the exception handler 70 of the JVM 60 implements step 305. If the JVM 60 determines that an applicable catch block for the exception object is located at step 304, then the JVM 60 implements step 306 discussed below. On the other hand, if an applicable catch block is not identified at step 304, then the JVM 60 implements step 307 discussed below.

At step 306, the JVM 60 determines whether an escaped flag is set for an applicable catch block located at step 304. In implementations, the exception handler 70 of the JVM 60 determines whether an escape flag (e.g., & Escaped8) was set for the applicable catch block in accordance with step 303.

At step 307, the JVM 60 creates a stack trace (call stack snapshot or stack traceback) in response to a determination at step 306 that the escaped flag is set for an applicable catch block; or creates the stack trace in response to the determination that no catch block was located at step 305. The term stack trace as used herein refers to a report of the active stack frames at a certain point in time during the execution of a program (e.g., at the time of the thrown exception object), wherein the stack trace enables a full JAVA call stack to be generated by the JVM 60 based on information of the stack trace. In embodiments, creating the stack trace comprises: obtaining all call stack information by the exception handler 70, and writing, by the exception handler 70, all of the call stack information to a string (JAVA string). The term string as used herein refers to a sequence of characters that exist as an object. JAVA strings are created by the JVM 60 and manipulated through a string class and, once created, are immutable. It should be understood that the existence of the escaped flag at step 306 indicates that there may be a consumer of the stack trace. On the other hand, if stack walking the JVM 60 does not find any applicable catch block at step 305, then the exception object thrown is an uncaught exception and thus will also require the stack trace to be created in accordance with step 307.

In contrast to step 307, at step 308, if no escaped flag is set and an applicable catch block is located at step 305, the JVM 60 does not create a stack trace by the exception handler 70. In other words, if an applicable catch block for the exception object is present with no associated escaped flag, the JVM 60 knows that the exception object will not escape the applicable catch block, and a stack trace will not be consumed. It should be understood that refraining from generating a stack trace when a user will not consume the stack trace conserves resources of the computer system 12 during exception handling.

At step 309, the JVM 60 unwinds the call stack and transfers exception handling control to either a user defined catch block or default catch block (in the case where an applicable catch block is not located), or the applicable catch block. In aspects, the exception handler 70 of the JVM 60 knows that the exception object will not escape the applicable catch block if the escaped flag is not set, and thus unwinds the stack and transfers control to the applicable catch block. JAVA tools and procedures for unwinding call stacks may be utilized in the implementation of step 309.

At step 310, the catch block of step 309 implements a handling of the exception object in response to the transfer of control to the catch block. In aspects, the exception handler 70 causes the applicable catch block to address the exception object in accordance with JAVA exception handling methods. In aspects, if an exception is uncaught by any catch blocks, a default catch block in the JVM 60 prints out the stack trace and then terminates the program. In aspects, if an exception is caught by a catch block, the escaped flag indicates that the stack trace may be needed, so the snapshot of the stack is created. Whether the stack trace is printed out is determined by the exception handling code in the applicable catch block. Additionally, whether the program is terminated is determined by the exception handling code in the applicable catch block. In aspects, a catch block causes the stack trace to be printed at step 310.

In one embodiment, the computer-implemented method for selective JAVA stack trace implementation comprises: in response to loading of bytecodes by a JVM 60, scanning the bytecodes to identify catch blocks; determining, for each catch block identified, whether an exception object escapes the catch block; in response to a determination that the exception object does escape the catch block, setting an escaped flag; in response to a JAVA thread throwing an exception at runtime, walking a stack by the exception handler 70 to locate a respective catch block; in response to locating the respective catch block, determining whether the escaped flag is set; in response to a determination that the escaped flag is set, a possible consumer of a stack snapshot exists, and creating the stack snapshot by the exception handler 70; in response to a determination that the escaped flag is not set, the exception object will not escape the catch block and the exception handler 70 unwinding the stack and transferring control to the catch block; in response to a determination that when stack walking the exception handler 70 does not find a respective catch block, identifying the exception thrown as an uncaught exception; and creating the stack snapshot by the exception handler 70.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for selective JAVA stack trace implementation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3)

incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having program instructions embodied therewith, the program instructions executable by a computing device to cause the computing device to:
   create, by a Java virtual machine (JVM), an exception object in response to an exception event;
   determine, by the JVM, whether the exception object has escaped the catch block by performing a data flow walk by a bytecode verifier of the JVM;
   set an escaped flag for the catch block upon determining that the exception object has escaped the catch block;
   determine, by the JVM, whether an escaped flag has been set for a catch block associated with the exception object, wherein the catch block associated with the exception object is configured to implement the handling of the exception object; and
   determine, by the JVM, whether to create a stack trace based on the determining whether the escaped flag is set, wherein the JVM creates the stack trace when the escaped flag is set and does not create the stack trace when the escaped flag is not set;
   wherein performing the data flow walk by the bytecode verifier of the JVM comprises identifying an exception as escaping a particular catch block if a first bytecode of the particular catch block is any bytecode except pop or astore.

2. The computer program product of claim 1, wherein the program instructions further cause the computing device to: scan, by the JVM, Java bytecodes to identify the catch block in response to the loading of the Java bytecodes by the JVM.

3. The computer program product of claim 2, wherein the determining whether the exception object has escaped the catch block further comprises performing an escape analysis pass on intermediate language by a just in time (JIT) compiler of the JVM.

4. The computer program product of claim 1, wherein the program instructions further cause the computing device to:
   determine, by the JVM, that the exception object has escaped the catch block; and
   set, by the JVM of the computing device, an escaped flag based on the determining that the exception object has escaped the catch block.

5. The computer program product of claim 1, wherein the program instructions further cause the computing device to: walk, by the JVM, a call stack to determine whether the catch block associated with the exception object is present.

6. The computer program product of claim 5, wherein the program instructions further cause the computing device to:
   determine, by the JVM, that the catch block associated with the exception object is not present; and
   create, by the JVM of the computing device, the stack trace based on the determining that the catch block associated with the exception object is not present.

7. The computer program product of claim 6, wherein the program instructions further cause the computing device to print the stack trace.

8. The computer program product of claim 5, wherein the program instructions further cause the computing device to:
   determine, by the JVM, that the catch block associated with the exception object is present, wherein the determining whether the escaped flag has been set occurs after determining the catch block is present.

9. A computer-implemented method, comprising:
   identifying, by a Java virtual machine (JVM) of a computing device, catch blocks by scanning bytecodes in response to the loading of the bytecodes by the JVM;
   determining, by the JVM of the computing device, for at least one of the catch blocks that an exception object has escaped the at least one of the catch blocks of the Java bytecodes by performing a data flow walk by a bytecode verifier of the JVM, wherein the JVM determines that the exception object has escaped the at least one of the catch blocks based on a first bytecode of the at least one of the catch blocks being any bytecode except pop or astore;
   setting, by the JVM of the computing device, an escaped flag for the at least one of the catch blocks based on the determining that the exception object escapes the at least one of the catch blocks, wherein the escaped flag indicates that the exception object escapes the at least one of the catch blocks;
   walking, by the JVM of the computing device, a call stack to locate an applicable catch block for the exception object, wherein the applicable catch block is the at least one of the catch blocks;
   determining, by the JVM of the computing device, that the escaped flag is set in response to locating the applicable catch block; and
   creating, by the JVM of the computing device, a stack trace based on the determining that the escaped flag is set.

10. The computer-implemented method of claim 9, further comprising:
    creating, by the JVM of the computing device, the exception object upon determining that an exception event has occurred; and
    maintaining, by the JVM of the computing device, a list of the catch blocks including associated escaped flags.

11. The computer-implemented method of claim 9, wherein the determining for at least one of the catch blocks that an exception object has escaped the at least one of the catch blocks of the Java bytecodes further comprises performing an escape analysis pass on intermediate language by a just in time (JIT) compiler of the JVM.

12. The computer-implemented method of claim 9, further comprising: printing, by the JVM of the computing device, the stack trace.

13. A system comprising:
    a processor, a computer readable memory and a computer readable storage medium associated with a computing device;
    a Java virtual machine (JVM);
    program instructions to walk a stack by an exception handler of the JVM to locate an applicable catch block from a plurality of catch blocks, if present, in response to a Java thread throwing an exception at runtime;

program instructions to determine, for each of the plurality of catch blocks, whether an exception object escapes the catch block, by:
  performing a data flow walk by a bytecode verifier of the JVM; and
  performing an escape analysis pass on intermediate language by a just in time (JIT) compiler of the JVM;
program instructions to set an escape flag for each of the plurality of catch blocks that the exception object escapes;
program instructions to determine whether an escaped flag is set for the applicable catch block in a list of the plurality of catch blocks based on the JVM locating the applicable catch block, wherein the escaped flag indicates that the exception has escaped the applicable catch block;
program instructions to create a snapshot of the stack by the exception handler of the JVM upon determining that the escaped flag is set;
program instructions to unwind the stack and transfer control of exception handling to the applicable catch block, a user defined catch block, or a default catch block;
program instructions to identify the exception as an uncaught exception based on the JVM failing to locate the applicable catch block; and
program instructions to create the stack snapshot by the exception handler based on identifying the exception as the uncaught exception,
wherein performing the data flow walk by a bytecode verifier of the JVM comprises identifying the exception as escaping a particular catch block if a first bytecode of the particular catch block is any bytecode except pop or astore; and
wherein the program instructions are stored on the computer readable storage medium for execution by the processor via the computer readable memory.

14. The system of claim 13, further comprising: program instructions to scan Java bytecodes loaded by the JVM to identify the plurality of catch blocks.

15. The system of claim 13, wherein the performing the escape analysis pass on intermediate language by a just in time (JIT) compiler of the JVM comprises performing the escape analysis pass on intermediate language generated when a method is queued for compilation, and updating catch block metadata.

16. The system of claim 13, further comprising program instructions to print the stack snapshot.

17. The system of claim 13, further comprising program instructions to implement an exception handling function by the applicable catch block upon the transfer of control of the exception handling to the applicable catch block, the defined catch block, or the default catch block.

* * * * *